United States Patent Office 2,716,642
Patented Aug. 30, 1955

2,716,642

TREATMENT OF POLYVINYLCHLORIDE WITH LITHIUM ALUMINUM HYDRIDE

John Daniel Cotman, Jr., Springfield, Mass., assignor to Monsanto Chemical Company, St. Louis, Mo., a corporation of Delaware No Drawing. Application September 12, 1952, Serial No. 309,386

4 Claims. (Cl. 260—92.8)

This invention relates to polymeric materials containing carbon, hydrogen and chlorine. More particularly, the invention relates to a process for preparing saturated thermoplastic polymers containing carbon, hydrogen and chlorine.

Polyvinyl chloride may be prepared by various methods to produce high molecular weight materials which have many advantageous properties as compared to other thermoplastic materials. The polymers have one serious drawback and that is instability to heat and light. The problem has been overcome at least to some extent by the incorporation of various materials as stabilizers. This solution to the problem has been based on the theory that either chlorine or hydrochloric acid breaks off from the polymer chain and causes degradation of the polymer.

One object of this invention is to provide new polymeric saturated thermoplastics containing carbon, hydrogen and chlorine.

A further object is to modify the chemical composition of polyvinyl chloride to render it more stable to heat and light.

Another object is to provide a process for producing new polymeric saturated thermoplastics containing carbon, hydrogen and chlorine.

Still another object is to provide a process for substituting hydrogen for chlorine in polyvinyl chloride without degrading the polymer.

These and other objects are attained by reacting a polymer of vinyl chloride, a polymer of vinylidene chloride or a copolymer of vinyl chloride and vinylidene chloride with lithium aluminum hydride in an anhydrous solvent for the reactants in the absence of oxygen.

The following examples are given in illustration of this invention and are not intended as limitations on the scope thereof. Where parts are mentioned, they are parts by weight.

Example I

Dissolve 5 parts of polyvinyl chloride having a degree of polymerization of about 1400 in 300 parts of anhydrous tetrahydrofuran. Then dissolve 0.5 part of lithium aluminum hydride in the solution and disperse 2 parts of lithium hydride therein. Heat the solution at reflux temperature and atmospheric pressure in the absence of oxygen for 14 hours. Cool the reaction mixture and add water to precipitate the polymer and destroy excess reducing agent. Then acidify the solution with nitric acid to dissolve any aluminum salts that may have formed. Recover the polymer by filtration and purify it by washing with water to remove adsorbed inorganic salts. Dry the purified polymer.

The product is a white amorphous powder partially soluble in hot xylene and hot cyclohexanone. It has physical and chemical properties similar to those of the original polymer except that it is somewhat softer and much more stable to heat and light. On analysis, the product is found to contain 46% chlorine by weight which corresponds to the substitution of 34% of the original chlorine atoms by hydrogen atoms. The degree of polymerization of the product is substantially unchanged.

Example II

Dissolve 5 parts of polyvinyl chloride having a degree of polymerization of about 1400 in 400 parts of anhydrous tetrahydrofuran and add 1.5 parts of lithium hydride and 2.5 parts of lithium aluminum hydride to the solution. Heat the solution at reflux temperature and atmospheric pressure in the absence of oxygen for about 50 hours. Cool the reaction mixture, precipitate the polymer with water and acidify the solution with nitric acid. Recover the product by filtration, wash it with water and then dry it. The product is a rubbery flexible material having a degree of polymerization of substantially 1400. It retains its flexibility even at temperatures as low as $-25°$ C. Analysis indicates that about 75% of the original chlorine atoms have been replaced by hydrogen.

Example III

Dissolve 5 parts of lithium aluminum hydride and 5 parts of polyvinyl chloride having a degree of polymerization of about 1400 in 400 parts of anhydrous tetrahydrofuran and disperse 1 part of lithium hydride in the solution. Heat the solution at atmospheric pressure and reflux temperature in the absence of oxygen for 143 hours. Recover the product by precipitation with water and filtration. It is waxy and flexible and partially crystalline but shows no evidence of polymer degradation in the course of the reaction. Analysis indicates that about 91% of the original chlorine is replaced by hydrogen.

Example IV

Dissolve 5 parts of polyvinyl chloride having a degree of polymerization of about 1400 and 3 parts of lithium aluminum hydride in 500 parts of tetrahydrofuran. Heat the solution at reflux temperature and atmospheric pressure in the absence of oxygen for about 8 hours. Cool and recover the product by precipitation with water followed by filtration. The product is an amorphous rigid polymer similar to that of Example I except that about 42% of the chlorine has been replaced by hydrogen.

Example V

Dissolve 1 part of lithium aluminum hydride and 1 part of polyvinyl chloride having a degree of polymerization of about 1400 in 75 parts of anhydrous tetrahydrofuran. Heat the solution at reflux temperature and atmospheric pressure in the absence of oxygen for about 315 hours. Recover the product by precipitation with water followed by filtration and drying. The product is a waxy flexible polymer in which about 97% of the chlorine atoms have been replaced by hydrogen.

Infra-red analysis of the products of each of the examples shows that they are saturated materials and that the chlorine atoms left are randomly distributed along the polymeric chain. No appreciable rupture of the original polymer chains can be detected and there is no indication of any crosslinking having occurred during the reaction.

The process of this invention should be carried out in an anhydrous medium in the absence of oxygen. A convenient method of excluding oxygen is to carry out the reaction under reflux conditions such that the pressure of the solvent vapor in the reaction vessel is sufficient to bar the entrance of oxygen. Alternatively, the reaction medium may be blanketed with an oxygen-free inert gas such as nitrogen.

The anhydrous reaction medium should be a solvent for both the polymer and the lithium aluminum hydride, and it should be unreactive towards both ingredients. Solvents for lithium aluminum hydride which are unreactive thereto are restricted generally to aliphatic ethers which may be acyclic or alicyclic and include dialkyl ethers containing from 1 to 8 carbon atoms in the alkyl groups which may be the same or different and alicyclic ethers such as dioxane and tetrahydrofuran. Among the acyclic ethers which may be used are dimethyl, diethyl, diisopropyl, dioctyl, ethylmethyl, etc. ethers. The polymers are soluble only in tetrahydrofuran and dioxane of the ether group. As a result, tetrahydrofuran and dioxane are the preferred solvents. If tetrahydrofuran is used, there is no point in using a mixed solvent. However, dioxane has only fair solvent power towards the lithium aluminum hydride so that it is preferable to mix the dioxane with a stronger solvent for the hydride such as diethyl ether when it is desired to use dioxane as the solvent for the polymer. For more efficient reaction, the process should be carried out in dilute solutions containing no more than 20% polymer by weight. The primary reducing agent is lithium aluminum hydride. It is efficient when used as the sole reducing agent. It is convenient to use a small amount of lithium aluminum hydride in conjunction with a larger amount of lithium hydride since the lithium hydride, even though it is substantially insoluble in the solvents, serves to reform the lithium aluminum hydride as the latter is consumed by the reaction. In other words, with lithium hydride present, lithium aluminum hydride is formed in situ from the residues of the reducing reaction. The amount of the lithium aluminum hydride may be varied according to the product desired. As little as 50 parts per 100 parts of polymer will efficiently substitute about 50% of the chlorine with hydrogen. For best results, about 100 parts of the reducing agent should be used per 100 parts of polymer and, if desired, an excess of reducing agent may be used.

The degree of the reducing action is governed partly by the amount of reducing agent, partly by the temperature and partly by the duration of the reaction. It is convenient to carry out the reaction at reflux temperature and atmospheric pressure. Temperatures below the reflux temperature may be used provided care is taken to exclude oxygen. At temperatures below 40° C., the reaction becomes quite sluggish. If it is desired to speed up the reaction, the temperature may be raised to as high as 150° C. accompanied by an increase in pressure to well above atmospheric pressure.

The duration of the reaction has particular influence on the removal of the last 50% of the chlorine. In from 8 to 14 hours, depending on temperature and concentration of the reducing agent, nearly 50% of the chlorine is removed. In order to remove the remainder of the chlorine, it is necessary to extend the reaction for periods up to 350 hours.

After the reaction is completed, water is added to the reaction medium. This serves to precipitate the polymer and destroy the excess reducing agent by reaction therewith. Basic aluminum salts which form during the reaction are dissolved by treatment with dilute acid. The polymer is then recovered by filtration and further freed from adsorbed salts by washing with water. Finally, the polymer is dried at temperatures up to about 100° C. Attempts to carry out the reaction using other well-known reducing agents such as sodium amalgum and alcohol produced cross-linked products which contained multiple unsaturated linkages. Such products are air-sensitive and have poor molding properties.

The polymers which may be treated by the process of this invention are homopolymers of vinyl chloride or vinylidene chloride and copolymers of vinyl chloride and vinylidene chloride. Valuable products may be obtained from such polymers and copolymers which have a degree of polymerization above 100 and the most valuable products are obtained from polymers and copolymers having a degree of polymerization above 1000.

The products of the reaction are saturated thermoplastic materials in which from 30 to 97% of the chlorine has been replaced by hydrogen. They may be worked by the usual processes such as extrusion, calendering, roll milling, compression molding, etc. They are stable to heat and light without the addition of conventional stabilizing materials and may be compounded with conventional plasticizers, fillers, lubricants, dyes, pigments, etc., to produce a wide variety of attractive and useful articles.

It is obvious that variations may be made in the products and processes of this invention without departing from the spirit and scope thereof as defined in the appended claims.

What is claimed is:

1. A process for the preparation of thermoplastic polymeric materials consisting of a multiple carbon-to-carbon chain and containing only carbon, hydrogen and chlorine atoms, said chlorine atoms being randomly distributed on the carbon-to-carbon chain which comprises reacting a homopolymer of vinyl chloride having a degree of polymerization in excess of 100, with lithium aluminum hydride, said reaction being carried out in solution in an anhydrous aliphatic ether under anhydrous and oxygen-free conditions.

2. A process as in claim 1 wherein the material is a homopolymer of vinyl chloride having a degree of polymerization of about 1400.

3. A process as in claim 1 wherein the solvent is tetrahydrofuran.

4. A process as in claim 1 wherein part of the lithium aluminum hydride is replaced by lithium hydride.

References Cited in the file of this patent

UNITED STATES PATENTS

| | | |
|---|---|---|
| 2,183,556 | Fawcett | Dec. 19, 1939 |
| 2,199,992 | Hale | May 7, 1940 |
| 2,536,114 | Weaver | Jan. 2, 1951 |